(12) United States Patent
Tamura et al.

(10) Patent No.: US 9,896,003 B2
(45) Date of Patent: Feb. 20, 2018

(54) SHOULDER SUPPORT ADJUSTER AND VEHICLE SEAT

(71) Applicant: TOYOTA JIDOSHA KABUSHIKI KAISHA, Toyota-shi (JP)

(72) Inventors: Hiroshi Tamura, Toyota (JP); Akira Kaneko, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 36 days.

(21) Appl. No.: 15/023,959

(22) PCT Filed: Aug. 27, 2014

(86) PCT No.: PCT/JP2014/072492
§ 371 (c)(1),
(2) Date: Mar. 22, 2016

(87) PCT Pub. No.: WO2015/049937
PCT Pub. Date: Apr. 9, 2015

(65) Prior Publication Data
US 2016/0229316 A1    Aug. 11, 2016

(30) Foreign Application Priority Data
Oct. 4, 2013    (JP) ................................ 2013-209450

(51) Int. Cl.
*B60N 2/22*    (2006.01)
*B60N 2/44*    (2006.01)

(52) U.S. Cl.
CPC ......... *B60N 2/2222* (2013.01); *B60N 2/4415* (2013.01)

(58) Field of Classification Search
CPC .... B60N 2/4415; B60N 2/665; B60N 2/2222; A47C 1/024; A47C 1/0244; A47C 7/405; A47C 7/467
(Continued)

(56) References Cited

U.S. PATENT DOCUMENTS 3,712,666 A * 1/1973 Stoll ..................... A47C 1/036
297/313
5,082,326 A * 1/1992 Sekido ................ B60N 2/4415
297/284.6
(Continued)

FOREIGN PATENT DOCUMENTS

JP    6-296530    10/1994
JP    8-322674    12/1996
(Continued)

OTHER PUBLICATIONS

International Search Report dated Sep. 22, 2014, in PCT/JP2014/072492 filed Aug. 27, 2014.
(Continued)

*Primary Examiner* — Timothy J Brindley
(74) *Attorney, Agent, or Firm* — Oblon, McClelland, Maier & Neustadt, L.L.P.

(57) ABSTRACT

A shoulder support adjuster includes a shoulder support, a bending angle adjusting mechanism, and a bending position adjusting mechanism. The bending angle adjusting mechanism and the bending position adjusting mechanism are provided within the shoulder support of a vehicle seat. At the bending angle adjusting mechanism, a bending angle of the seatback is adjusted by inflating an airbag. Further, at the bending position adjusting mechanism, by inflating the airbag and airbags, a flexed position of a shoulder plate is moved downward, and a bending position of the seatback changes downward. The bending position of the seatback is thereby adjusted.

8 Claims, 6 Drawing Sheets

(58) Field of Classification Search
USPC .................................................. 297/354.11
See application file for complete search history.

(56) References Cited

U.S. PATENT DOCUMENTS

| | | | | | |
|---|---|---|---|---|---|
| 5,137,329 | A | * | 8/1992 | Neale .................... | A47C 7/467 297/284.1 |
| 5,280,997 | A | * | 1/1994 | Andres .................. | A47C 7/467 297/284.6 |
| 5,348,378 | A | * | 9/1994 | Zhang .................... | A47C 7/025 267/154 |
| 5,370,443 | A | * | 12/1994 | Maruyama ........... | B60N 2/2222 297/284.1 |
| 5,704,689 | A | * | 1/1998 | Kim ....................... | A47C 7/441 297/301.4 |
| 5,860,699 | A | * | 1/1999 | Weeks ................... | A47C 7/467 297/284.1 |
| 6,129,419 | A | * | 10/2000 | Neale .................... | B60N 2/4415 297/284.4 |
| 6,203,105 | B1 | * | 3/2001 | Rhodes, Jr. ............. | A47C 4/54 297/284.1 |
| 6,283,547 | B1 | * | 9/2001 | Bauer .................. | B60N 2/4415 297/284.1 |
| 8,696,065 | B2 | * | 4/2014 | Udriste ................. | B64D 11/06 244/122 R |
| 8,899,683 | B2 | * | 12/2014 | Ito ........................ | B60N 2/1615 297/354.11 |
| 2007/0057551 | A1 | * | 3/2007 | Lachenmann ....... | B60N 2/4492 297/284.9 |
| 2007/0228790 | A1 | * | 10/2007 | Schurg .................. | A47C 7/467 297/284.4 |
| 2008/0277985 | A1 | * | 11/2008 | Petzel .................... | A47C 7/467 297/284.6 |
| 2016/0129920 | A1 | * | 5/2016 | Hall ....................... | B60W 50/16 701/1 |
| 2017/0036634 | A1 | * | 2/2017 | Ohno .................... | B60R 21/013 |
| 2017/0080838 | A1 | * | 3/2017 | Dry ....................... | B60N 2/4415 |
| 2017/0156519 | A1 | * | 6/2017 | Cheng .................. | A47G 9/1027 |

FOREIGN PATENT DOCUMENTS

| | | |
|---|---|---|
| JP | 2000-23780 A | 1/2000 |
| JP | 2010-284256 A | 12/2010 |

OTHER PUBLICATIONS

International Preliminary Report on Patentability dated Sep. 3, 2015 in PCT/JP2014/072492 (with English language translation and Annex).

* cited by examiner

SHOULDER SUPPORT ADJUSTER AND VEHICLE SEAT

TECHNICAL FIELD

The present invention relates to a shoulder support adjuster and a vehicle seat.

BACKGROUND ART

As a vehicle seat that is equipped with a shoulder support that supports the shoulder portions of a vehicle occupant seated in a seat, Japanese Patent Application Laid-Open (JP-A) No. H08-322674 discloses a technique in which the lower end portion of a shoulder support is pivotally-supported, and this shoulder support can swing in the vehicle longitudinal direction. Further, JP-A No. H06-2966530 discloses a technique in which plural actuators, that change between a usage position at which a shoulder support supports the shoulder portions of a vehicle occupant and a usual position at which the shoulder support does not support the shoulder portions of the vehicle occupant, are provided at the shoulder support.

SUMMARY OF INVENTION

Technical Problem

However, these prior art techniques do not consider the seated height of the vehicle occupant, and there is room for further improvement from the standpoint of adjusting the shoulder support in accordance with the physique of the vehicle occupant.

In view of the above-described circumstances, an object of the present invention is to obtain a shoulder support adjuster and a vehicle seat that can adjust a shoulder support in accordance with the physique of a vehicle occupant and by taking the seated height of the vehicle occupant into consideration as well.

Solution to Problem

In a first aspect of the present invention, there is provided a shoulder support adjuster comprising: a shoulder support that structures an upper portion of a seatback, and that supports shoulder portions of a vehicle occupant seated in a seat main body, the seatback supporting a back portion of the vehicle occupant and being capable of bending midway at an intermediate portion in a vehicle vertical direction; a bending angle adjusting mechanism that is provided within the shoulder support, and that adjusts a bending angle of the seatback in a case in which the seatback bends midway; and a bending position adjusting mechanism that is provided within the shoulder support, and that adjusts a bending position of the seatback in a case in which the seatback bends midway.

In the above-described structure, the bending angle adjusting mechanism and the bending position adjusting mechanism are provided within the shoulder support that structures the upper portion of a seatback that can bend midway at the intermediate portion thereof in the vehicle vertical direction.

Due to the bending angle of the seatback being adjusted by the bending angle adjusting mechanism at the time when the seatback bends midway, the shoulder support can be made to fit the upper body of the vehicle occupant seated in the seat main body. Moreover, at the time when the seatback bends midway, the bending position of the shoulder support can be adjusted in accordance with the seated height of the vehicle occupant seated in the seat main body, by the bending position adjusting mechanism.

In a second aspect of the present invention, in the first aspect of the present invention, the bending angle adjusting mechanism and the bending position adjusting mechanism may respectively be made able to be adjusted independently.

In accordance with the above-described structure, the bending angle adjusting mechanism and the bending position adjusting mechanism are independently adjustable, and therefore, the shoulder support can be adjusted to an optimal position in accordance with the physique of the vehicle occupant.

In a third aspect of the present invention, in the first or second aspect of the present invention, a control device, at which positional adjustment of the shoulder support is controlled such that the bending angle adjusting mechanism and the bending position adjusting mechanism operate in that order, may be provided.

In the above-described structure, the bending angle adjusting mechanism and the bending position adjusting mechanism are operated in that order by the control device. For example, the bending position of the seatback is a standard position for a vehicle occupant of a standard physique, and therefore, there are also cases in which adjustment of the bending position of the seatback becomes unnecessary merely by operating the bending angle adjusting mechanism before.

In a fourth aspect of the present invention, in any one of the first through third aspects of the present invention, the bending angle adjusting mechanism has a first airbag to which compressed air is supplied from an air supply source, and the bending position adjusting mechanism has a second airbag to which compressed air is supplied from the air supply source.

In the above-described structure, the bending angle adjusting mechanism and the bending position adjusting mechanism are provided with the first airbag and the second airbag, respectively. Further, the first airbag and the second airbag respectively inflate when compressed air is supplied thereto from the air supply source, and, at the time when the seatback bends midway, the bending angle of the seatback is made to be adjustable, and further, the bending position is made to be adjustable.

In a fifth aspect of the present invention, in the fourth aspect of the present invention, the bending angle adjusting mechanism may include: a fixed plate that, within the shoulder support, is fixed to a vehicle longitudinal direction rear side of the first airbag and holds the first airbag; and a rotating plate that, within the shoulder support, is disposed at a vehicle longitudinal direction rear side of the second airbag and holds the second airbag, a vehicle vertical direction lower end portion of the rotating plate being pivotally-supported at the fixed plate, and the bending position adjusting mechanism may include: a flexing plate that, within the shoulder support, is disposed at a vehicle longitudinal direction front side of the rotating plate, an upper portion of the flexing plate facing the rotating plate, a point of flexing being provided between the upper portion and a lower portion, such that a position of the point of flexing moves toward a vehicle vertical direction lower side as amounts of swelling of the first airbag and the second airbag increase.

In accordance with the above-described structure, the bending angle adjusting mechanism includes, within the shoulder support, the fixed plate that is fixed to the vehicle longitudinal direction rear side of the first airbag, and the first airbag is held by this fixed plate. Therefore, when compressed air is supplied to the first airbag, this first airbag inflates toward the vehicle longitudinal direction front side, and the shoulder support is pushed toward the vehicle longitudinal direction front side via this first airbag, and the bending angle of the seatback changes.

Further, the bending angle adjusting mechanism includes, within the shoulder support, the rotating plate that is disposed at the vehicle longitudinal direction rear side of the second airbag and that holds this second airbag. On the other hand, the bending position adjusting mechanism includes, within the shoulder support, the flexing plate that is disposed at the vehicle longitudinal direction front side of the rotating plate.

The vehicle vertical direction lower end portion of the rotating plate is pivotally-supported at the fixed plate. Therefore, when compressed air is supplied to the first airbag, the angle of the rotating plate changes around the vehicle vertical direction lower end portion in accordance with the amount of swelling of this first airbag. In this state, when compressed air is supplied to the second airbag, this second airbag inflates toward the vehicle longitudinal direction front side, and the flexing plate is pushed toward the vehicle longitudinal direction front side via this second airbag. Due thereto, the shoulder support is pushed toward the vehicle longitudinal direction front side via this flexing plate, and the bent position of the seatback changes.

A sixth aspect of the present invention provides a vehicle seat comprising: a seatback that supports a back portion of a vehicle occupant seated in a seat main body, and that is capable of bending midway at an intermediate portion in a vehicle vertical direction; and the shoulder support adjuster of any one of the first through fifth aspects of the present invention that is provided within a shoulder support that structures an upper portion of the seatback and supports shoulder portions of the vehicle occupant.

In the above-described structure, the seatback, that supports the back portion of the vehicle occupant seated in the seat main body, is made able to bend midway at the intermediate portion thereof in the vehicle vertical direction. The shoulder support adjuster of the present invention is provided within the shoulder support that structures the upper portion of this seatback and that supports the shoulder portions of the vehicle occupant.

Advantageous Effects of Invention

As described above, the first aspect of the present invention has the excellent effect that, within the one seatback, the shoulder support can be adjusted in accordance with the physique of the vehicle occupant by taking the seated height of the vehicle occupant into consideration as well.

The second aspect of the present invention has the excellent effect that the shoulder support can be adjusted to the optimal position in accordance with the physique of the vehicle occupant.

The third aspect of the present invention has the excellent effect that, in the case of a vehicle occupant of a standard physique, the work processes can be reduced in the adjusting of the position of the shoulder support.

The fourth aspect of the present invention has the excellent effect that, because the airbags are inflated, the cushioning ability of the shoulder support can be further improved.

The fifth aspect of the present invention has the excellent effect that the bending angle and the bending position of the seatback can be adjusted by simple structures.

The sixth aspect of the present invention has the excellent effect that, within the one seatback, the shoulder support can be adjusted easily in accordance with the physique of the vehicle occupant by taking the seated height of the vehicle occupant into consideration as well.

DESCRIPTION OF EMBODIMENTS

An embodiment of a vehicle seat of the present invention is described on the basis of the drawings. Note that arrow UP in the drawings indicates the upward direction of the vehicle, arrow FR indicates the frontward direction of the vehicle, and arrow RH indicates the rightward direction of the vehicle, respectively. In the following description, when longitudinal and vertical directions are used without being specified, they indicate the longitudinal of the vehicle longitudinal direction and the vertical of the vehicle vertical direction.

<Structure of Vehicle Seat>

Figure 3:
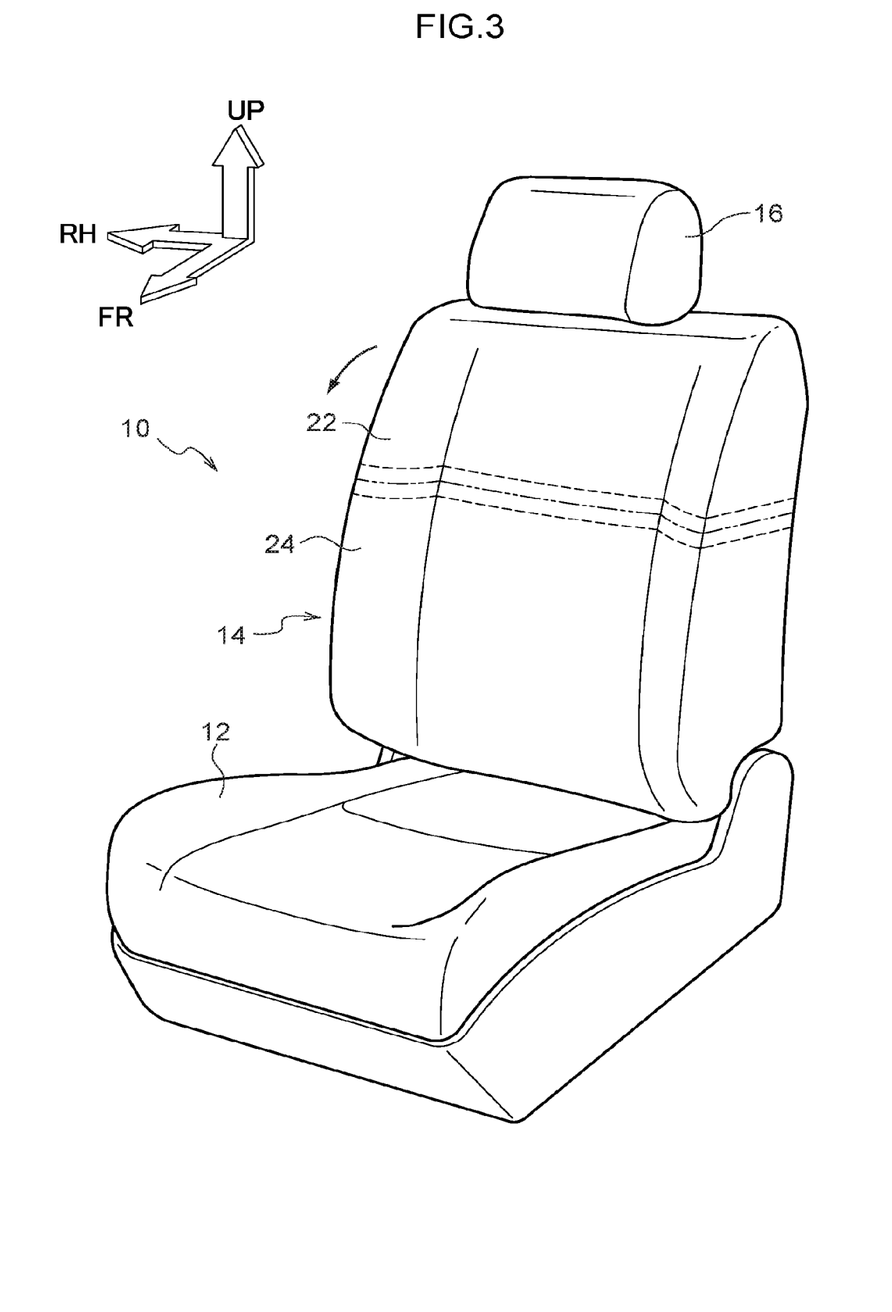
FIG. 3 is a perspective view showing a vehicle seat to which the shoulder support adjuster relating to the present embodiment is applied.

First, the structure of a vehicle seat, to which a shoulder support adjuster relating to the present embodiment is applied, is described. As shown in FIG. 3, a vehicle seat 10 that serves as a seat main body is structured to include a seat cushion 12 that supports the buttock region and thigh region of a vehicle occupant, a seatback 14 that supports the back of the vehicle occupant, and a headrest 16 that is provided at the upper end portion of the seatback 14 so as to be able to be adjusted vertically and that supports the head of the vehicle occupant.

Figure 1A:
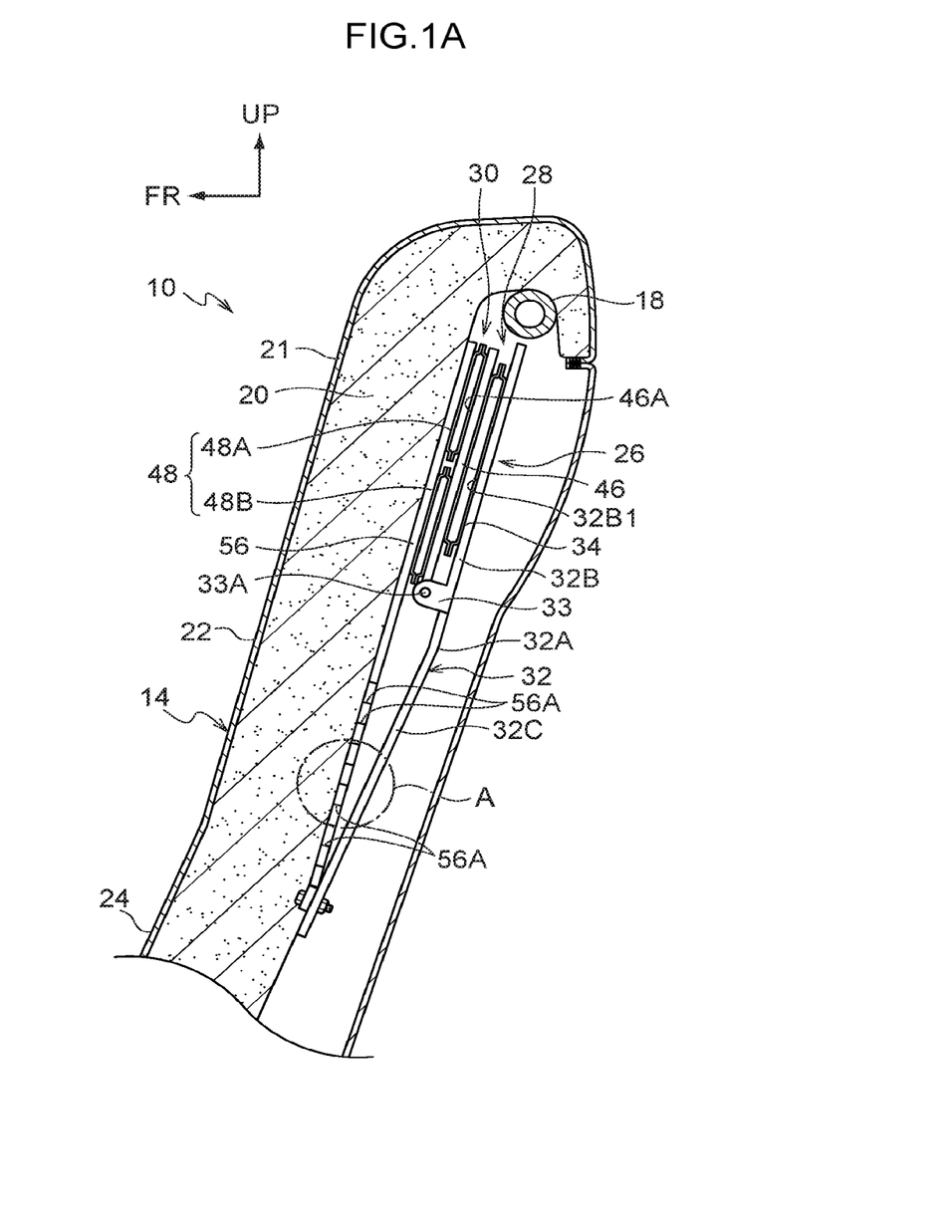
FIG. 1A is a vertical sectional view showing a shoulder support to which a shoulder support adjuster relating to the present embodiment is applied.

As shown in FIG. 1A, a seatback frame 18, that is substantially rectangular and that structures the skeleton portion of the seatback 14, is disposed within the seatback 14. The seatback frame 18 is covered by a urethane pad 20 that is formed of foamed urethane and is elastically deformable, and the surface of the urethane pad 20 is covered by a skin material 21 that is formed of fabric, leather, synthetic leather, or the like.

Here, as shown in FIG. 3, the seatback 14 is structured to include a shoulder support 22 that is provided at the upper portion of the seatback 14, and a lumbar support 24 that is provided at the lower portion of the seatback 14. Further, the shoulder support 22 tilts forward (in the direction of the arrow) with respect to the lumbar support 24 and can bend midway. Here, in the present embodiment, as shown in FIG. 1A, a bending angle adjusting mechanism 28 and a bending position adjusting mechanism 30, that structure a shoulder support adjuster 26, are provided within the shoulder support 22.

(Bending Angle Adjusting Mechanism)

A lumbar plate 32, that is substantially rectangular plate shaped and serves as a fixed plate and extends along the vehicle vertical direction, is disposed (fixed) via unillustrated seatback springs at the seat frame 18 as a member that structures a portion of the bending angle adjusting mechanism 28. A bent portion 32A, that is bent toward the rear side, is provided at the central portion in the vehicle vertical direction of this lumbar plate 32.

Due to this bent portion 32A, the lumbar plate 32 is disposed in a state in which a lumbar plate upper portion 32B, that is provided at the upper portion of the lumbar plate 32, is tilted forward with respect to a lumbar plate lower portion 32C that is provided at the lower portion of the lumbar plate 32. Note that, because the lumbar plate lower portion 32C is disposed so as to be inclined toward the rear side while heading toward the upper side, the lumbar plate upper portion 32B is disposed in a state of being slightly erect with respect to the lumbar plate lower portion 32C.

Figure 4:
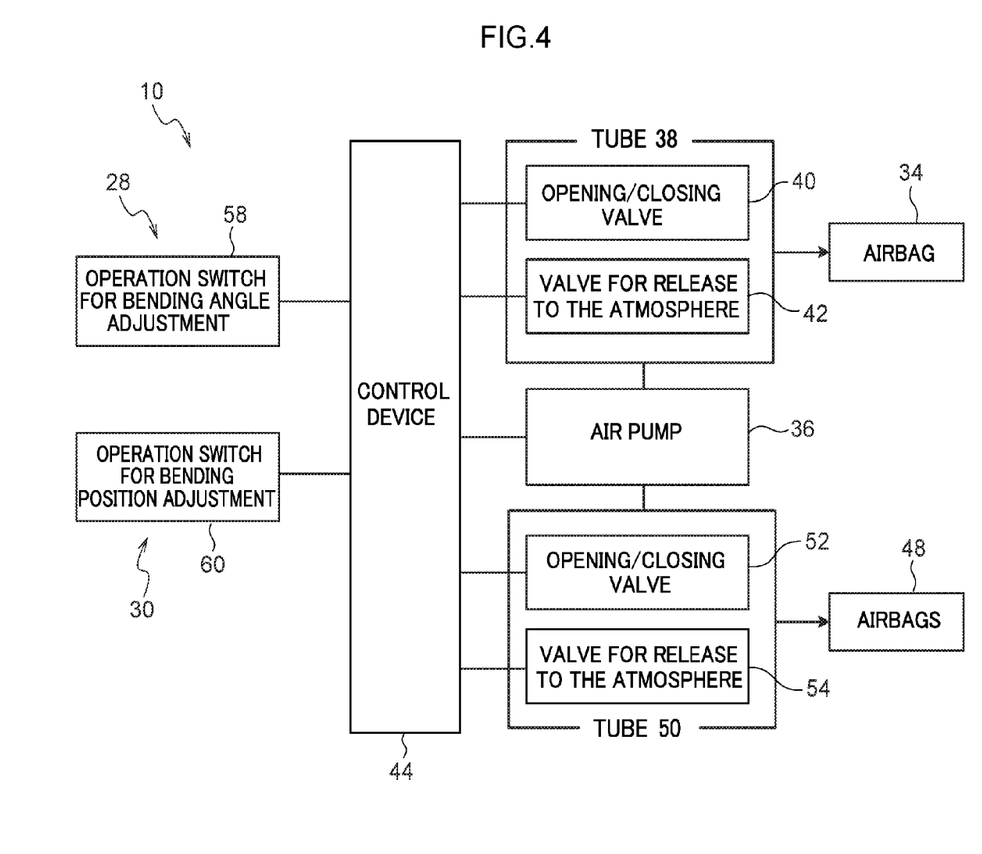
FIG. 4 is a block diagram showing the structure of the shoulder support adjuster relating to the present embodiment.

An airbag 34 serving as a first airbag is mounted to a front surface 32B1 of the lumbar plate upper portion 32B. This airbag 34 is formed by, for example, the peripheral edge portions of two fabrics being welded. As shown in FIG. 4, an air pump 36 serving as an air supply source is connected to the airbag 34 via a tube 38, and compressed air can be supplied into the airbag 34 by this air pump 36 (to be described later).

An opening/closing valve 40 that can communicate the tube 38 interior and the airbag 34 interior, and valve 42 for release to the atmosphere that can communicate the airbag 34 interior and the atmosphere, are connected to the tube 38. The opening/closing valve 40 and the valve 42 for release to the atmosphere are respectively electrically connected to a control device 44, and can be respectively controlled independently by this control device 44.

Further, as shown in FIG. 1A, shaft receiving portions 33 are provided, as members that structure portions of the bending angle adjusting mechanism 28, so as to project-out at both vehicle transverse direction end portions of the lumbar plate upper portion 32B, at the bent portion 32A side of the front surface 32B1 of the lumbar plate upper portion 32B. Pins 33A are pivotally-supported at these shaft receiving portions 33, and these pins 33A extend along the vehicle transverse direction.

Figure 2A:
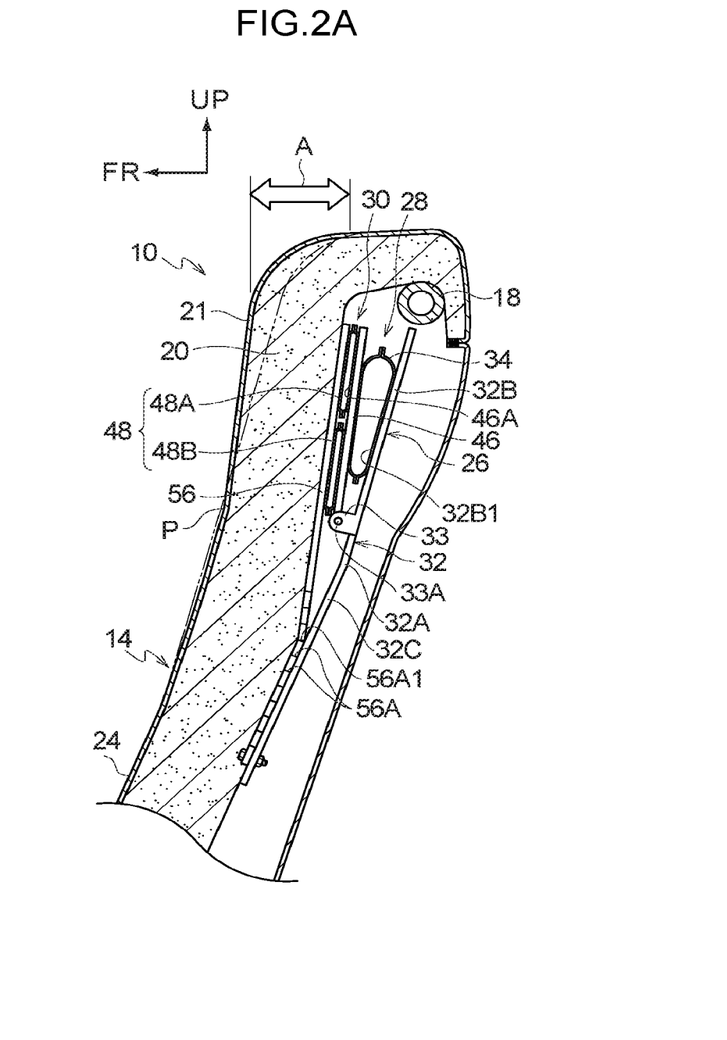
FIG. 2A is a vertical sectional view for explaining operation of a bending angle adjusting mechanism of the shoulder support to which the shoulder support adjuster relating to the present embodiment is applied.

The lower end portion of an upper plate 46, that is substantially rectangular plate shaped and that serves as a rotating plate, is fixed to the pins 33A, and this upper plate 46 is disposed so as to face the lumbar plate upper portion 32B with the airbag 34 therebetween. Therefore, as shown in FIG. 2A, when compressed air is supplied into the airbag 34 and this airbag 34 swells, the upper plate 46 rotates toward the front side via the pins 33A.

(Bending Position Adjusting Mechanism)

On the other hand, two airbags 48 (airbag 48A, airbag 48B) serving as second airbags are mounted along the vehicle vertical direction to a front surface 46A of the upper plate 46 as members that structure portions of the bending position adjusting mechanism 30. In the same way as the airbag 34, these airbags 48 also are formed by, for example, the peripheral edge portions of two fabrics being welded. Note that the airbags 48 may be formed by one airbag. Further, as shown in FIG. 4, the air pump 36 is connected via a tube 50 to these airbags 48, and compressed air can be supplied into the airbags 48 by this air pump 36 (to be described later).

An opening/closing valve 52 that can communicate the tube 50 interior and the airbag 48 interiors, and a valve 54 for release to the atmosphere that can communicate the airbag 48 interiors and the atmosphere, are connected to the tube 50. The opening/closing valve 52 and the valve 54 for release to the atmosphere are respectively electrically connected to the control device 44, and can be respectively controlled independently by this control device 44.

Here, as shown in FIG. 1A, a shoulder plate 56, that is substantially rectangular plate shaped and serves as a flexing plate and that faces the upper plate 46 with the airbags 48 therebetween, is provided at the front side of the upper plate 46. The lower end portion of the shoulder plate 56 extends further downward than the lower end portion of the upper plate 46, and the lower end portion of the shoulder plate 56 is fixed to the lower end portion of the lumbar plate lower portion 32C.

Figure 1B:
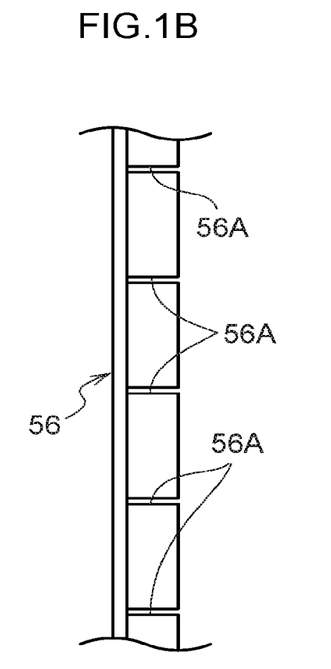
FIG. 1B is a partial enlarged view in which portion A in FIG. 1A is enlarged.

Further, as shown in FIG. 1B, notch portions 56A are formed in the lower portion side of the shoulder plate 56 from the rear side toward the front side, and a plurality of these notch portions 56A are provided at a predetermined pitch along the vehicle vertical direction. Due thereto, at the positions of the notch portions 56A in the vehicle vertical direction, the shoulder plate 56 can be flexed in a state in which the upper side thereof is tilted forward, and the position of a flexed portion 56A1 (see FIG. 2A, FIG. 2B) is shifted, and the region of contact of the shoulder plate 56 with the lumbar plate lower portion 32C changes.

(Control Device)

Here, as shown in FIG. 4, the air pump 36 that is for supplying compressed air to the airbag 34, 48 interiors, is electrically connected to the control device 44, and can be driven by this control device 44.

On the other hand, an operation switch 58 for bending angle adjustment and an operation switch 60 for bending position adjustment are respectively disposed at the vehicle seat 10. The operation switch 58 for bending angle adjustment and the operation switch 60 for bending position adjustment are electrically connected to the control device 44, and can respectively be controlled independently by this control device 44. Further, the bending angle adjusting mechanism 28 and the bending position adjusting mechanism 30 are controlled so as to operate in that order.

For example, the operation switch 58 for bending angle adjustment and the operation switch 60 for bending position adjustment are respectively sliding-type switches. At the bending angle adjusting mechanism 28, the operation switch 58 for bending angle adjustment is slid to one side. Thereupon, the valves 42, 54 for release to the atmosphere and the opening/closing valve 52 are closed and the opening/closing valve 40 is opened, by the control device 44. Then, the air pump 36 is driven, compressed air is supplied into the airbag 34 via the tube 38, and, as shown in FIG. 2A, the airbag 34 inflates.

When the airbag 34 inflates, the upper plate 46 rotates via the pins 33A toward the front side in accordance with the amount of inflation of the airbag 34. Due thereto, the upper plate 46 pushes the urethane pad 20, and the bending angle of the shoulder support 22 changes from the two-dot chain line as shown by the solid line, and the shoulder support 22 tilts forward. In this way, at the time when the seatback 14 bends midway, the bending angle of this seatback 14 can be adjusted (the range shown by arrow A) by the bending angle adjusting mechanism 28 at the shoulder support 22.

Note that, when the operation switch 58 for bending angle adjustment shown in FIG. 4 is slid to the other side, the valve 42 for release to the atmosphere is opened, and the compressed air within the airbag 34 is released into the atmosphere. Due thereto, the compressed air within the airbag 34 is discharged-out, and the airbag 34 contracts. At this time, the upper plate 46 shown in FIG. 3A is pushed by the restoring force of the urethane pad 20, and rotates via the pins 33A toward the rear side in accordance with the amount of contraction of the airbag 34, and the shoulder support 22 tilts rearward.

Figure 2B:
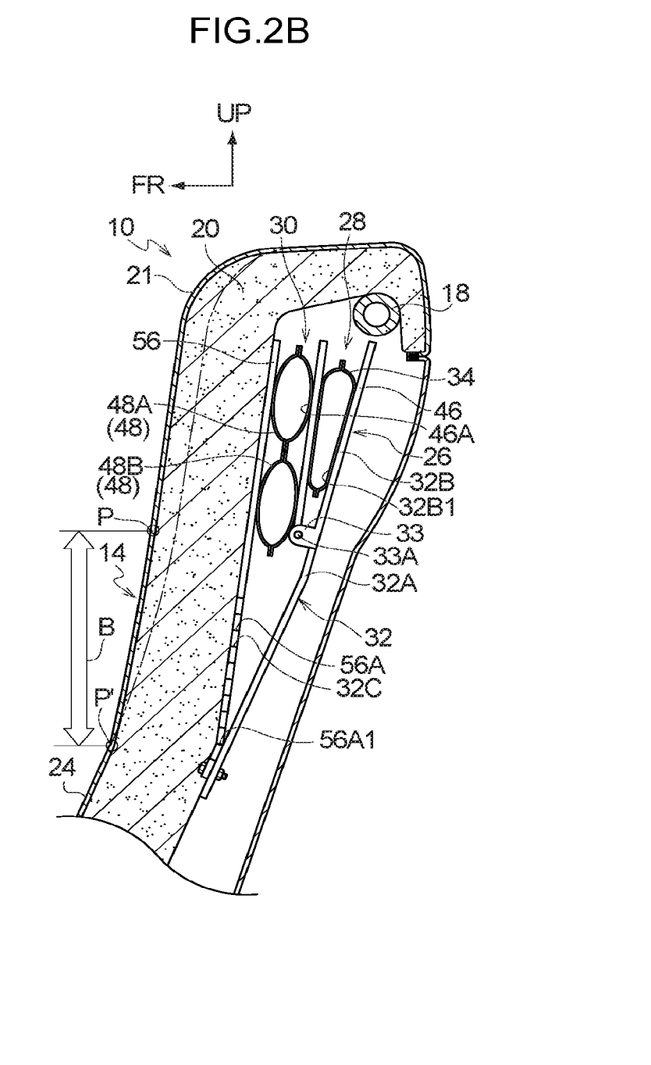
FIG. 2B is a vertical sectional view for explaining operation of a bending position adjusting mechanism of the shoulder support to which the shoulder support adjuster relating to the present embodiment is applied.

On the other hand, after the airbag 34 is inflated and the bending angle of the shoulder support 22 is adjusted, at the bending position adjusting mechanism 30, the operation switch 60 for bending position adjustment shown in FIG. 4 is slid to one side. Thereupon, the valves 42, 54 for release to the atmosphere and the opening/closing valve 40 are closed and the opening/closing valve 52 is opened, by the control device 44. Then, compressed air is supplied into the airbags 48 via the tube 50, and, as shown in FIG. 2B, the airbags 48A, 48B respectively inflate.

When the airbags 48 inflate, the shoulder plate 56 is pushed toward the front side in accordance with the amount of inflation of the airbags 48. Due thereto, the shoulder plate 56 pushes the urethane pad 20, and the position of the flexed portion 56A1 of the shoulder plate 56 moves downward from the two-dot chain line as shown by the solid line, and bending position P of the seatback 14 changes downward (P→P'). In this way, at the time when the seatback 14 bends midway, the bending position of this seatback 14 can be adjusted (the range shown by arrow B) by the bending position adjusting mechanism 30 at the shoulder support 22.

Note that, when the operation switch 60 for bending position adjustment shown in FIG. 4 is slid to the other side, the valve 54 for release to the atmosphere is opened, and the compressed air within the airbags 48 is released into the atmosphere. Due thereto, the compressed air within the airbags 48 is discharged-out, and the airbags 48 contract. At this time, the shoulder plate 56 shown in FIG. 2B is pushed by the restoring force of the urethane pad 20 and rotates toward the rear side in accordance with the amount of contraction of the airbags 48, and the position of the flexed portion 56A1 of the shoulder plate 56 moves upward, and bending position P' of the seatback 14 changes upward (P'→P).

(Operation/Effects of Vehicle Seat)

The operation/effects of the vehicle seat, to which the shoulder support adjuster relating to the present embodiment is applied, are described next. As shown in FIG. 2A, the seatback 14 of the vehicle seat 10 relating to the present embodiment can be bent midway at the intermediate portion thereof in the vehicle vertical direction, and the portion where the seatback 14 is bent midway is made to be the shoulder support 22, and the shoulder portions of the vehicle occupant are supported by this shoulder support 22. The bending angle adjusting mechanism 28 and the bending position adjusting mechanism 30 are provided within this shoulder support 22.

At the bending angle adjusting mechanism 28, by sliding the operation switch 58 for bending angle adjustment (see FIG. 4) to one side and inflating the airbag 34, the bending angle of the seatback 14 can be adjusted at the time when the seatback 14 bends midway. Due thereto, the shoulder support 22 can be made to fit the upper body of the vehicle occupant seated in the vehicle seat 10.

Further, at the bending position adjusting mechanism 30, by sliding the operation switch 60 for bending position adjustment (see FIG. 4) to one side and inflating the airbags 48 as shown in FIG. 2B, the position of the flexed portion 56A1 of the shoulder plate 56 moves downward, and the bending position P of the seatback 14 changes downward (P→P'). In this way, due to the bending position adjusting mechanism at the shoulder support 22, the bending position of the seatback 14 is adjusted at the time when the seatback 14 bends midway. Due thereto, the shoulder support 22 can be adjusted in accordance with the seated height of the vehicle occupant seated in the vehicle seat 10.

In this way, in the present embodiment, within the one seatback 14, the shoulder support 22 can be adjusted in accordance with the physique of the vehicle occupant and by taking the seated height of the vehicle occupant into consideration as well.

Further, in the present embodiment, at the shoulder support adjuster 26, the bending angle adjusting mechanism 28 and the bending position adjusting mechanism 30 are independently adjustable, and therefore, the shoulder support 22 can be adjusted to an optimal position in accordance with the physique of the vehicle occupant.

Here, the bending angle adjusting mechanism 28 and the bending position adjusting mechanism 30 are operated in that order by the control device 44 (see FIG. 4). In the case of a vehicle occupant of a standard physique, the bending position of the seatback 14 is the standard position, and therefore, there are also cases in which the shoulder support 22 can be set at the optimal position merely by carrying out the bending angle adjusting mechanism 28. In this case, by carrying out setting at the bending angle adjusting mechanism 28 before, the need to carry out adjustment of the bending position of the seatback 14 is eliminated, and the work processes can be reduced.

Moreover, in the present embodiment, the bending angle adjusting mechanism 28 and the bending position adjusting mechanism 30 have the airbags 34, 48, respectively. Further, due to compressed air being supplied from the air pump 36 (see FIG. 4) to the airbags 34, 48 and the airbags 34, 48 respectively inflating toward the vehicle longitudinal direction front side, at the time when the seatback 14 bends midway, the bending angle of this seatback 14 can be adjusted, and further, the bending position can be adjusted. In this way, the cushioning ability of the shoulder support 22 can be improved by inflating the airbags 34, 48.

Further, in the present embodiment, the bending angle of the seatback 14 is changed in accordance with the amount of inflation of the airbag 34, and further, the bending position of the seatback 14 changes in accordance with the amount of inflation of the airbag 34 and the airbags 48. Namely, in accordance with the present embodiment, the bending angle and the bending position of the seatback 14 can be adjusted by simple structures.

Supplemental Description of Embodiment

In the present embodiment, the bending angle adjusting mechanism 28 and the bending position adjusting mechanism 30 of the seatback 14 are independently adjustable, but do not necessarily have to be made independent, and the bending angle adjusting mechanism 28 and the bending position adjusting mechanism 30 may be made able to be adjusted interlockingly with one another. In this case, the bending angle adjusting mechanism 28 and the bending position adjusting mechanism 30 are adjusted on the basis of the correlation between the bending angle and the bending position of the seatback 14 from an ergonomic standpoint.

Further, in the present embodiment, the bending angle adjusting mechanism 28 and the bending position adjusting mechanism 30 are controlled by the control device 44 so as to operate in that order, but do not necessarily have to be in that order.

Moreover, members that structure portions of the bending angle adjusting mechanism 28 and the bending position adjusting mechanism 30 are the airbags 34, 48, but do not necessarily have to be the airbags 34, 48. For example, although not illustrated, the upper plate 46 and the shoulder plate 56 may respectively move along the vehicle longitudinal direction by driving mechanisms such as motors and gears or the like.

Further, in the present embodiment, the airbags 34, 48 are respectively mounted in one row along the vehicle longitudinal direction at the upper plate 46 and the shoulder plate 56, but pluralities thereof may be lined-up. Due to pluralities of the airbags 34, 48 being lined-up, the strokes of the upper plate 46 and the shoulder plate 56 can be increased. Moreover, these upper plate 46 and shoulder plate 56 are not absolutely necessary, and the airbags 34, 48 may be made to also have the functions of the upper plate 46 and the shoulder plate 56.

Further, in the present embodiment, at the airbag 48, the airbag 48A and the airbag 48B inflate respectively, but the airbag 48A and the airbag 48B may both inflate, or the airbag 48A only may be inflated. Due thereto, the bending position of the seatback 14 due to the bending angle adjusting mechanism 28 can be changed between cases in which only the airbag 48A is inflated and cases in which the airbag 48A and the airbag 48B are both inflated. Accordingly, at the bending position of the seatback 14 due to the bending angle adjusting mechanism 28 and the bending position adjusting mechanism 30, the breadth of choices can be further widened in accordance with the physique of the vehicle occupant.

Although an embodiment of the present invention has been described above, the present invention is not limited to this embodiment, and the embodiment and various modified examples may be combined appropriately, and the present invention may, of course, be implemented in various forms within a scope that does not depart from the gist thereof.

The invention claimed is:

1. A shoulder support adjuster comprising:
a shoulder support that structures an upper portion of a seatback, and that supports shoulder portions of a vehicle occupant seated in a seat main body, the seatback supporting a back portion of the vehicle occupant and being capable of bending midway at an intermediate portion in a vehicle vertical direction;
a bending angle adjusting mechanism that is provided within the shoulder support, and that includes a flexing plate which moves a position of a point of flexing along a vehicle vertical direction so as to adjust a bending angle of the seatback in a case in which the seatback bends midway; and
a bending position adjusting mechanism that is provided within the shoulder support, and that adjusts a bending position of the seatback in a case in which the seatback bends midway,
wherein the bending angle adjusting mechanism has a first airbag to which compressed air is supplied from an air supply source, and the bending position adjusting mechanism has a second airbag to which compressed air is supplied from the air supply source.

2. The shoulder support adjuster of claim 1, wherein the bending angle adjusting mechanism and the bending position adjusting mechanism are independently adjustable.

3. The shoulder support adjuster of claim 1, further comprising a control device at which positional adjustment of the shoulder support is controlled such that the bending angle adjusting mechanism and the bending position adjusting mechanism operate in that order.

4. The shoulder support adjuster of claim 1, wherein the bending angle adjusting mechanism includes:
a fixed plate that, within the shoulder support, is fixed to a vehicle longitudinal direction rear side of the first airbag and holds the first airbag, and
a rotating plate that, within the shoulder support, is disposed at a vehicle longitudinal direction rear side of the second airbag and holds the second airbag, a vehicle vertical direction lower end portion of the rotating plate being pivotally-supported at the fixed plate; and
wherein the bending position adjusting mechanism includes:
a flexing plate that, within the shoulder support, is disposed at a vehicle longitudinal direction front side of the rotating plate, an upper portion of the flexing plate facing the rotating plate, a point of flexing being provided between the upper portion and a lower portion, such that a position of the point of flexing moves toward a vehicle vertical direction lower side as amounts of swelling of the first airbag and the second airbag increase.

5. A vehicle seat comprising:
a seatback that supports a back portion of a vehicle occupant seated in a seat main body, and that is capable of bending midway at an intermediate portion in a vehicle vertical direction; and
the shoulder support adjuster of claim 1 that is provided within a shoulder support that structures an upper portion of the seatback and supports shoulder portions of the vehicle occupant.

6. The shoulder support adjuster of claim 2, further comprising a control device at which positional adjustment of the shoulder support is controlled such that the bending angle adjusting mechanism and the bending position adjusting mechanism operate in that order.

7. A shoulder support adjuster comprising:
a shoulder support that structures an upper portion of a seatback, and that supports shoulder portions of a vehicle occupant seated in a seat main body, the seatback supporting a back portion of the vehicle occupant and being capable of bending midway at an intermediate portion in a vehicle vertical direction;
a bending angle adjusting mechanism that is provided within the shoulder support, and that adjusts a bending angle of the seatback in a case in which the seatback bends midway; and
a bending position adjusting mechanism that is provided within the shoulder support, and that adjusts a bending position of the seatback in a case in which the seatback bends midway,
wherein the bending angle adjusting mechanism has a first airbag to which compressed air is supplied from an air supply source, and the bending position adjusting mechanism has a second airbag to which compressed air is supplied from the air supply source,
wherein the bending angle adjusting mechanism includes:
a fixed plate that, within the shoulder support, is fixed to a vehicle longitudinal direction rear side of the first airbag and holds the first airbag, and a rotating plate that, within the shoulder support, is disposed at a vehicle longitudinal direction rear side of the second airbag and holds the second airbag, a vehicle vertical direction lower end portion of the rotating plate being pivotally-supported at the fixed plate, and wherein the bending position adjusting mechanism includes:

a flexing plate that, within the shoulder support, is disposed at a vehicle longitudinal direction front side of the rotating plate, an upper portion of the flexing plate facing the rotating plate, a point of flexing being provided between the upper portion and a lower portion, such that a position of the point of flexing moves toward a vehicle vertical direction lower side as amounts of swelling of the first airbag and the second airbag increase.

8. A shoulder support adjuster comprising:

a shoulder support that structures an upper portion of a seatback, and that supports shoulder portions of a vehicle occupant seated in a seat main body, the seatback supporting a back portion of the vehicle occupant and being capable of bending midway at an intermediate portion in a vehicle vertical direction;

a bending angle adjusting mechanism that is provided within the shoulder support, and that adjusts a bending angle of the seatback in a case in which the seatback bends midway; and a bending position adjusting mechanism that is provided within the shoulder support, and that adjusts a bending position of the seatback so as to change the bending position relative to the setback along a vehicle vertical direction in a case in which the seatback bends midway, wherein the bending angle adjusting mechanism has a first airbag to which compressed air is supplied from an air supply source, and the bending position adjusting mechanism has a second airbag to which compressed air is supplied from the air supply source.

* * * * *